United States Patent Office 2,801,239
Patented July 30, 1957

2,801,239

METHOD OF HYDROLYZING CELLULOSE ESTERS

Gordon D. Hiatt, Loring W. Blanchard, Jr., and Leo J. Tanghe, Rochester, N. Y., assignors to Eastman Kodak Company, Rochester, N. Y., a corporation of New Jersey No Drawing. Application June 7, 1954,
Serial No. 435,044

7 Claims. (Cl. 260—230)

This invention relates to a method of hydrolyzing cellulose esters which have been prepared by an esterification using zinc chloride catalyst in which the zinc chloride is extracted from the esterification mass with water preliminary to the hydrolysis operation.

Ordinarily in the preparation of such esters as cellulose acetate, cellulose acetate propionate or cellulose acetate butyrate in which an active anhydride is employed to esterify cellulose a mineral acid particularly sulfuric acid is employed as the esterification catalyst. The esters so prepared are readily hydrolyzed by destroying the residual anhydride and imparting a small percentage of water to the mass by the addition of dilute aqueous acetic acid thereto, the sulfuric acid acting as a catalyst to promote the hydrolysis operation. In the preparation of esters of those acids having a low degree of reactivity such as for instance, crotonic, or isobutyric acid, other catalysts particularly zinc chloride have been found to be preferable particularly where esters of high viscosity are desired. By using zinc chloride catalyst for the esterification step the esterification is promoted but the rate of breakdown of the cellulose which is reacted upon is kept to a minimum. However, when hydrolysis of the cellulose ester, which has been thus prepared, is attempted the presence of zinc chloride in the mass is derogatory to the carrying out of the hydrolysis under the most desirable conditions. The presence of zinc chloride in the mass restricts the amount of water which can be added to the hydrolysis solution thus interfering with the best hydrolysis conditions. The presence of zinc chloride in the mass acts to increase the rate at which the viscosity of the cellulose ester decreases during its hydrolysis and where esters of a certain viscosity are desired the effect of the zinc chloride is detrimental.

Processes have been described for preparing hydrolyzed cellulose esters in which zinc chloride has been employed as the catalyst in the esterification. In those processes the cellulose ester has been separated from the esterification mass, washed and dried and was then dissolved in aqueous lower fatty acid and hydrolyzed while in that medium (see Cellulose Chemie, 1931, pages 67–70). This operation however is wasteful of solvent and the zinc chloride obtained by such a procedure is in very dilute aqueous solution so that its recovery from the dilution in which it is obtained is expensive.

One object of our invention is to provide a process for hydrolyzing cellulose esters which have been prepared by means of a zinc chloride catalyst in which the effect of the zinc chloride in the hydrolysis step is eliminated. Another object of our invention is to provide a method for hydrolyzing cellulose esters in which the catalyst employed in the hydrolyzing step is a mineral acid. A further object of our invention is to provide a method of hydrolyzing cellulose esters without the necessity of first separating the ester from the completed esterification bath in which it is in solution. A still further object of our invention is to provide a procedure for the hydrolysis of cellulose esters obtained in a reaction in which zinc chloride catalyst is used in which the zinc chloride is obtained from the mass in a form in which it is economically recoverable. A still further object of our invention is to provide a method for the hydrolysis of cellulose esters which allows a wide choice of water and hydrolysis catalyst levels. Other objects of our invention will appear herein.

We have found a method of hydrolyzing an organic acid ester of cellulose found in solution in an esterification bath containing zinc chloride catalyst which involves the removal of the zinc chloride therefrom and the hydrolysis of the ester in aqueous organic acid with the desired catalyst. In its broadest aspects our invention comprises a method of hydrolyzing a cellulose ester which is in solution in an esterification bath containing zinc chloride catalyst in which the zinc chloride present therein is extracted from the mass using water in a quantity limited to that which will retain the cellulose ester in a gummy condition in the reaction solvent following which the gummy mass is diluted with organic acid to give a solution of a cellulose ester and the ester is hydrolyzed in the bath which results from the addition of water and mineral acid catalyst to the mass. The extraction of the zinc chloride is preferably operated at least twice or a sufficient number of times that the zinc chloride is substantially completely removed from the mass preliminary to the hydrolysis operations.

The amount of water which is employed for extracting the zinc chloride from the mass is no more than that which will induce a gummy condition thereof and which amount may vary depending upon conditions; for instance, if considerable solvent is present in the esterification mass the amount of water used should be such that the solvent in which the cellulose ester is dissolved is sufficiently diluted that gumminess of the cellulose ester occurs, the amount used varying with the conditions of operation. The water which is mixed into the mass forms a separate phase the cellulose ester forming a gum mass thereby resulting in a gum liquid system. The gum mass is then worked in contact with the liquid. The water is not present in sufficient amount to precipitate the ester. In many cases the water is added in volume equal to the esterification solution.

After water has been added to a point sufficient to convert the cellulose ester to a gummy condition and after thorough mixing to facilitate the extraction of the zinc chloride the cellulose ester gum and the liquid portion of the mass are separated. There is then added to the cellulose ester gum mass further water and mixing is conducted so that the water is worked thoroughly through the mass to take up any further zinc chloride which is not removed by the first extraction. After the separation of the liquid from the gum mass the cellulose ester gum is redissolved in lower fatty acid either anhydrous followed by the addition of aqueous acid or in acid which already has some water content therein. Mineral acid catalyst such as sulfuric acid or hydrochloric acid is added to the solution preferably in the form of its dilute solution in lower fatty acid. The preferred proportion of mineral acid catalyst added as 0.05–.2 mole of the acid per liter of the hydrolysis solution. The mass is allowed to stand either at ordinary temperature or an elevated temperature such as 100° C., 120° F., 130° F. or temperatures between those and room temperature until the desired amount of hydrolysis has occurred. There is thereby obtained a cellulose ester of good viscosity and having the desired hydroxyl analysis. The zinc chloride solution obtained is in relatively concentrated condition and after the removal of water therefrom may be employed as the catalyst in subsequent esterification. The cellulose esters thus prepared are useful for the manufacture of products such as sheeting, plastic compositions or the like particularly for uses where esters of good viscosity are suitable.

The following extample illustrates the preparation of a hydrolyzed cellulose ester in accordance with our invention:

3.5 lbs. of esterification grade cotton linters were activated by soaking in water for ½ hour followed by displacing the water therefrom with glacial acid and the latter with isobutyric acid accompanied by centrifuging. The resulting mass consisting of 3.5 lbs. of cellulose and 3.1 lbs. of isobutyric acid was mixed together in a Werner-Pfleiderer mixer with 11.5 lbs. of isobutyric anhydride, 1.6 lbs. of acetic anhydride and 1.75 lbs. of zinc chloride for 6.5 hours at 130–140° F. To the completed esterification mass containing cellulose acetate isobutyrate in solution therein was added and stirred in 2 lbs. of distilled water (in the form of dilute aqueous acetic acid) which is approximately 1.5 lbs. of excess of water than is necessary to react with the anhydride present. 4.5 lbs. of the mass was removed, diluted and precipitated, this being designated sample A. There was added to the main mass 25.5 lbs. of water and the mixer was run for 1 hour at 100° F. outside temperature. The liquid present was poured off and discarded resulting in a cake having a weight of 15.2 lbs. 93.7% of the zinc chloride present was removed in this manner. Samples of this cake were hydrolyzed at two different dilutions. 3 lbs. of the cake were mixed with 3 lbs. of acetic acid, 10 ccs. of concentrated hydrochloric acid and 144 ccs. of distilled water. The cellulose ester was hydrolyzed by allowing the mass to stand at 110° F. for 102 hours. The sample thus obtained was designated B.

Another 3 lbs. of the cake was mixed with 6 lbs. of acetic acid, 25 ccs. of concentrated hydrochloric acid and 350 ccs. of distilled water. The cellulose ester was hydrolyzed by allowing the mass to stand at 110° F. for 73 hours. The cellulose acetate isobutyrate thus obtained was designated as sample C. The samples thus obtained were analyzed for free hydroxyl content and for intrinsic viscosity in acetic acid. The results of these determinations were as follows:

| Sample | Hydroxyl Content (Percent) | Intrinsic Viscosity In Acetic Acid Solution |
|---|---|---|
| A | 0.24 | 1.90 |
| B | 2.48 | 1.95 |
| C | 2.55 | 1.90 |

With the zinc chloride removed in considerable proportion from the esterification mass containing the cellulose ester, the material obtained can be readily hydrolyzed without any considerable viscosity reduction thereof in accordance with our invention.

We claim:

1. A method of hydrolyzing a cellulose ester which has been prepared in a dope esterification in which zinc chloride is employed as the catalyst which comprises mixing with the resulting esterification mass water in an amount no more than sufficient to convert it to a gum-liquid two phase mass, separating the liquid phase from the gum phase whereby zinc chloride is removed therefrom, subsequently dissolving the latter in aqueous lower fatty acid, adding hydrochloric acid and allowing the mass to stand until the cellulose ester is partially hydrolyzed.

2. A method of hydrolyzing a cellulose isobutyrate which has been prepared in a dope esterification in which zinc chloride is employed as the catalyst which comprises mixing with the resulting esterification mass water in an amount not more than sufficient to convert it to a gum-liquid two phase mass, separating the liquid phase from the gum phase whereby zinc chloride is removed therefrom, subsequently dissolving the latter in aqueous lower fatty acid, adding hydrochloric acid and allowing the mass to stand until the cellulose ester is partially hydrolyzed.

3. A method of hydrolyzing a cellulose isobutyrate which has been prepared in a dope esterification in which zinc chloride is employed as the catalyst which comprises mixing with the resulting esterification mass water in an amount not more than sufficient to convert it to a gum-liquid two phase mass, separating the liquid phase from the gum phase whereby zinc chloride is removed therefrom, mixing water with the mass to again form a gum-liquid mass and separating the liquid from the gum phase whereby further zinc chloride is removed, subsequently dissolving the gum phase in aqueous lower fatty acid, adding hydrochloric acid and allowing the mass to stand until the cellulose ester is partially hydrolyzed.

4. A method of hydrolyzing a cellulose isobutyrate which has been prepared in a dope esterification in which zinc chloride is employed as the catalyst which comprises mixing with the resulting esterification mass water in an amount not more than sufficient to convert it to a gum-liquid two phase mass, separating the liquid phase from the gum phase whereby zinc chloride is removed therefrom, mixing water with the mass to again form a gum-liquid mass and separating the liquid from the gum phase whereby further zinc chloride is removed, subsequently dissolving the gum phase in aqueous lower fatty acid, adding sulfuric acid and allowing the mass to stand until the cellulose ester is partially hydrolyzed.

5. A method of hydrolyzing a cellulose ester which has been prepared in a dope esterification using zinc chloride as the catalyst which comprises mixing the esterification mass thus obtained with water in an amount only sufficient to convert it to a gum-liquid two phase mass, separating the liquid phase from the gum phase, subsequently dissolving the cellulose ester gum mass in a dilute lower fatty acid, adding thereto a strong mineral acid selected from the group consisting of sulfuric acid and hydrochloric acid in an amount of .05–.2 mole per liter of solution and allowing the mass to stand until a desired partially hydrolyzed cellulose ester is obtained.

6. A method of hydrolyzing a cellulose ester which has been prepared in a dope esterification in which zinc chloride has been employed as the catalyst which comprises adding water to the esterification mass in an amount no more than sufficient to convert the whole to a gum-liquid two phase mass, separating the liquid phase from the gum phase, mixing the gum phase with water to again form a gum-liquid mass and separating the liquid phase from the gum phase, subsequently dissolving the gum phase in aqueous lower fatty acid, adding a mineral acid thereto selected from the group consisting of sulfuric acid and hydrochloric acid in an amount of .05–.2 mole per liter of solution and allowing the mass to stand until a desired partially hydrolyzed cellulose ester is obtained.

7. A method of hydrolyzing a cellulose isobutyrate which has been prepared in a dope esterification in which zinc chloride was employed as the catalyst which comprises mixing water with the resulting esterification mass in an amount only sufficient to convert it to a gum-liquid two phase mass, separating the liquid phase from the gum phase, subsequently dissolving the cellulose ester mass in aqueous lower fatty acid, adding a strong mineral acid selected from the group consisting of sulfuric acid and hydrochloric acid in an amount of .05–.2 mole per liter of solution and allowing the mass to stand until a desired partially hydrolyzed cellulose ester is obtained.

References Cited in the file of this patent

UNITED STATES PATENTS

| | | |
|---|---|---|
| 1,652,573 | Mallabar | Dec. 13, 1927 |
| 1,878,954 | Malm | Sept. 20, 1932 |
| 1,912,189 | Gault et al. | May 30, 1933 |
| 1,949,213 | Mason | Feb. 27, 1934 |